US006182019B1

(12) United States Patent
Wiklund

(10) Patent No.: US 6,182,019 B1
(45) Date of Patent: Jan. 30, 2001

(54) TRANSMITTER FOR PROVIDING A SIGNAL INDICATIVE OF FLOW THROUGH A DIFFERENTIAL PRODUCER USING A SIMPLIFIED PROCESS

(75) Inventor: David E. Wiklund, Eden Prairie, MN (US)

(73) Assignee: Rosemount Inc., Eden Prairie, MN (US)

(*) Notice: Under 35 U.S.C. 154(b), the term of this patent shall be extended for 0 days.

(21) Appl. No.: 08/879,396

(22) Filed: Jun. 20, 1997

Related U.S. Application Data

(63) Continuation of application No. 08/503,166, filed on Jul. 17, 1995, now abandoned.

(51) Int. Cl.[7] .................................................. G01F 1/34
(52) U.S. Cl. .......................................... 702/100; 702/138
(58) Field of Search .................................... 364/505, 506, 364/509, 510, 514 C, 571.01–571.04, 573, 578; 73/861, 861.01, 861.03; 702/98–100, 138, 140

(56) References Cited

U.S. PATENT DOCUMENTS

| 4,249,164 | 2/1981 | Tivy ................................. 340/870.3 |
| 4,562,744 | 1/1986 | Hall et al. ......................... 73/861.02 |
| 4,796,651 | 1/1989 | Ginn et al. ............................... 137/8 |
| 4,799,169 | 1/1989 | Mims ................................... 364/510 |
| 5,495,769 | 3/1996 | Broden et al. ......................... 73/718 |
| 5,606,513 | 2/1997 | Louwagie et al. .................... 364/510 |

OTHER PUBLICATIONS

"Orifice Metering Of Natural Gas and Other Related Hydrocarbon Fluid", Part 1, General Equations and Uncertainty Guidelines, American Gas Association, Report No. 3, American Petroleum Institute, API 14.3, Gas Processors Association, GPA 8185–90, Third Edition, Oct. 1990, A.G.A. Catalog No. XQ9017.

"Orifice Metering Of Natural Gas and Other Related Hydrocarbon Fluid", Part 2, Specification and Installation Requirements, American Gas Association, Report No. 3, American Petroleum Institute, API 14.3, Gas Processors Association, GPA 8185–90, Third Edition, Feb. 1991, A.G.A. Catalog No. XQ9104.

"Orifice Metering Of Natural Gas and Other Related Hydrocarbon Fluid", Part 3, Natural Gas Applications, American Gas Association, Report No. 3, American Petroleum Institute, API 14.3, Gas Processors Association, GPA 8185–92, Third Edition, Aug. 1992, A.G.A. Catalog No. XQ9210.

"Orifice Metering Of Natural Gas and Other Related Hydrocarbon Fluid", Part 4, Background, Development, Implementation Procedure, and Subroutine Documentation for Empirical Flange–Tapped Discharge Coefficient Equation, American Gas Association, Report No. 3, American Petroleum Institute, API 14.3, Gas Processors Association, GPA 8185–92, Third Edition, Oct. 1992, 2nd Printing Aug. 1995, A.G.A. Catalog No. XQ9211.

(List continued on next page.)

Primary Examiner—Marc S. Hoff
Assistant Examiner—Craig Steven Miller
(74) Attorney, Agent, or Firm—Westman, Champlin & Kelly, P.A.

(57) ABSTRACT

A transmitter provides an output signal indicative of mass flow rate of fluid through a conduit. The transmitter includes a temperature sensor providing a temperature signal indicative of fluid temperature. A static pressure sensor provides a static pressure signal indicative of static pressure in the conduit. A differential producer provides a differential pressure signal. The transmitter also includes a controller which provides the output signal indicative of mass flow of the fluid through the conduit.

38 Claims, 9 Drawing Sheets

OTHER PUBLICATIONS

"Compressibility Factors of Natural Gas and Other Related Hydrocarbon Gases", AGA Transmission Measurement Committee Report No. 8, American Petroleum Institute MPMS Chapter 14.2, Gas Research Institute, Catalog No. XQ9212, Second Edition, Nov. 1992, 2nd Printing Jul. 1994.

"Digital Computers For Gas Measuring Systems", by Robert D. Goodenough, 8131 *Advances in Instrumentation*, vol. 31, No. 4 (1976), pp. 1–4.

"Signal Transmission Put On A Pedestal", *Control and Instrumentation*, Sep., 1976, vol. 6, No. 8, pp. 28–29.

Numerical Recipes, Cambridge University Press, Press et al. 1992, 650–651 and 664–666.*

* cited by examiner

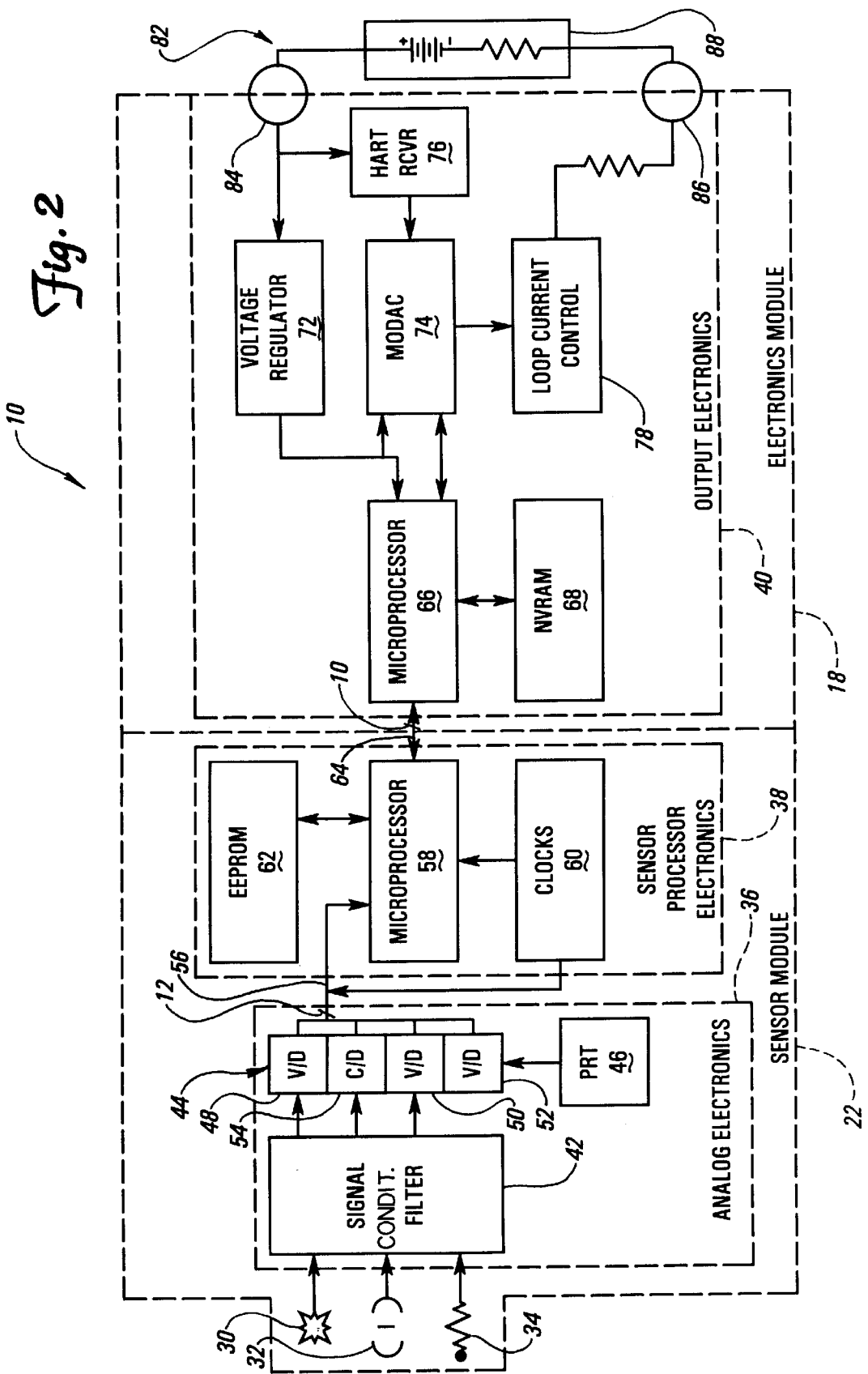

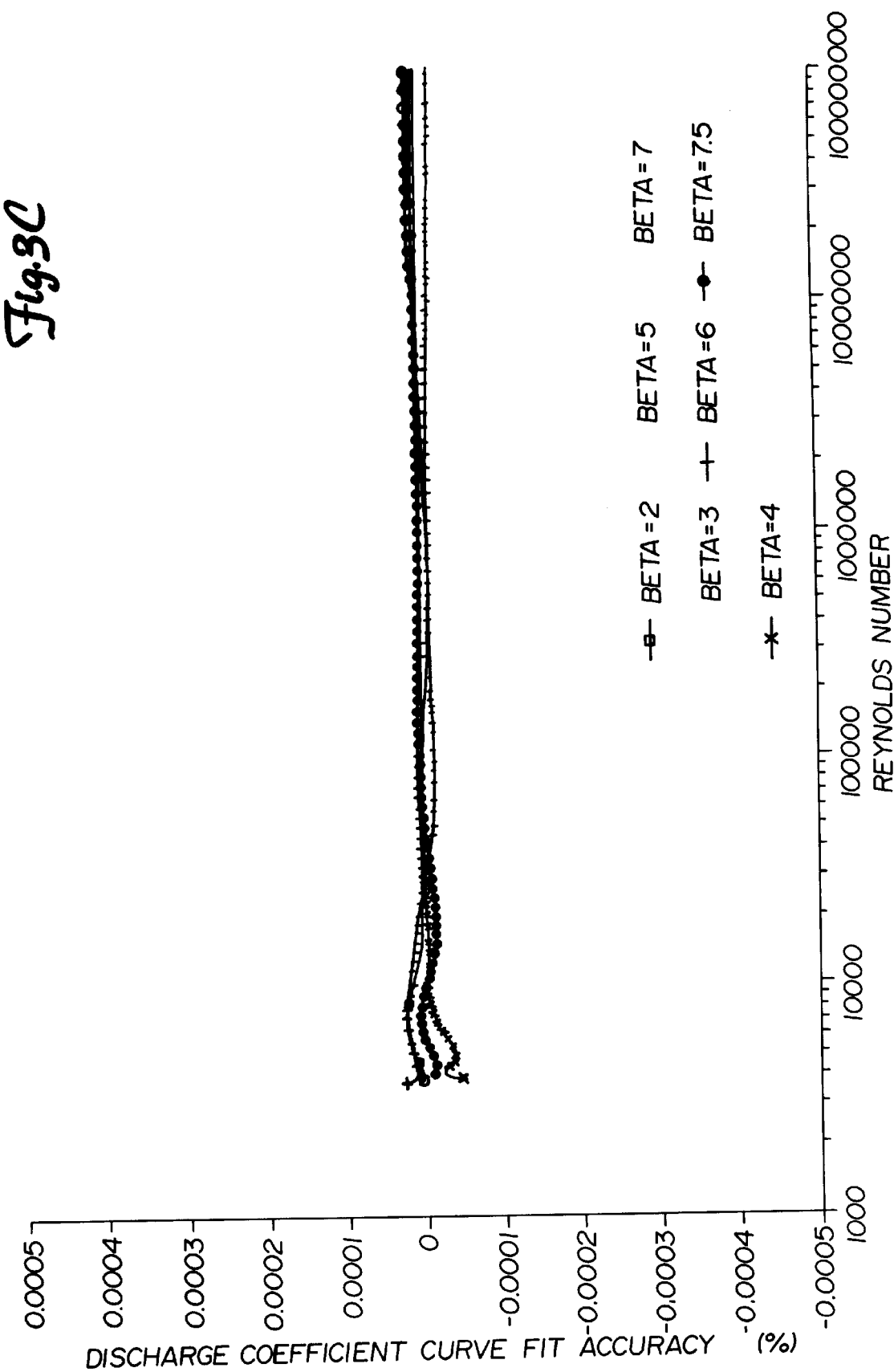

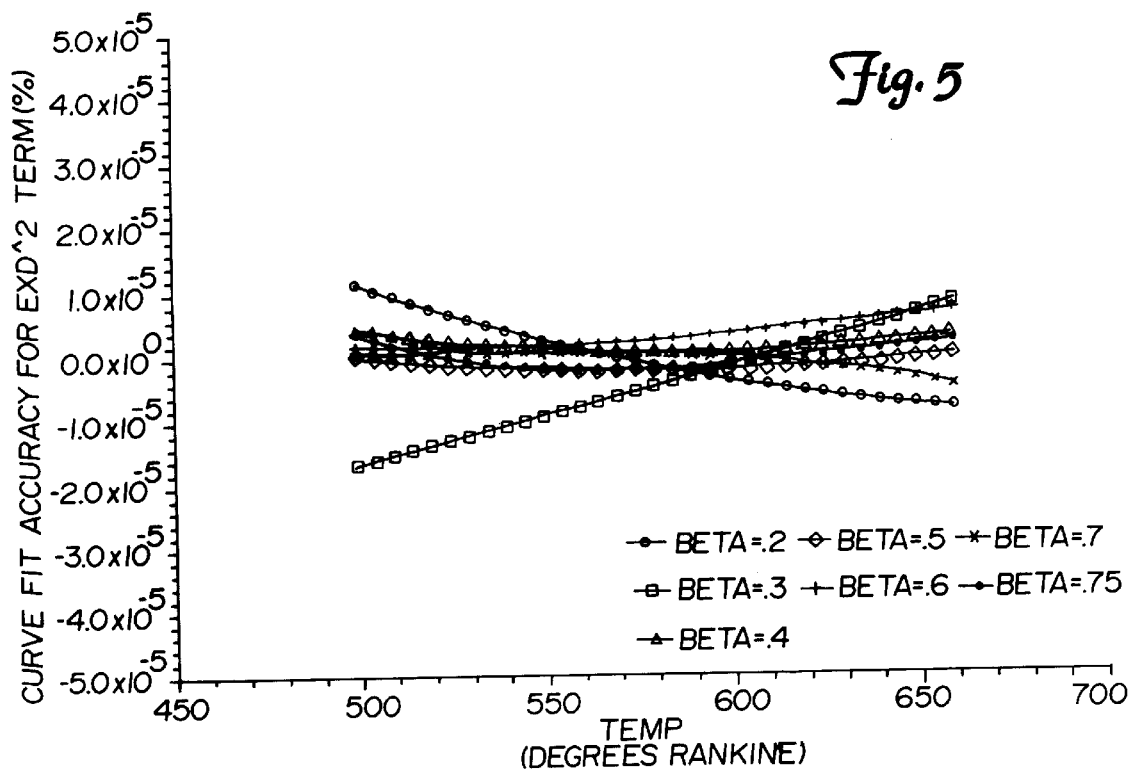

TRANSMITTER FOR PROVIDING A SIGNAL INDICATIVE OF FLOW THROUGH A DIFFERENTIAL PRODUCER USING A SIMPLIFIED PROCESS

This is a continuation of application Ser. No. 08/503,166, filed Jul. 17, 1995 now abandoned.

REFERENCE TO CO-PENDING APPLICATION

Reference is made to co-pending U.S. patent application Ser. No. 08/258,262, filed Jun. 9, 1994 now U.S. Pat. No. 5,606,513 entitled DIFFERENTIAL PRESSURE MEASUREMENT ARRANGEMENT UTILIZING DUAL TRANSMITTERS, and assigned to the same assignee as the present application, and to the U.S. patent applications referenced therein.

BACKGROUND OF THE INVENTION

The present invention deals with a transmitter in the process control industry. More particularly, the present invention deals with a simplified process, used in a transmitter, for providing an output signal indicative of flow through a differential producer.

Transmitters which sense various characteristics of fluid flowing through a conduit are known. Such transmitters typically sense and measure differential pressure, line pressure (or static pressure) and temperature of the process fluid. Such transmitters are typically mounted in the field of a refinery, or other process control industry installation. The field mounted transmitters are subject to significant constraints on power consumption. Such transmitters commonly provide an output in the form of a current representative of the variable being sensed. The magnitude of the current varies between 4–20 mA as a function of the sensed process variable. Therefore, the current available to operate the transmitter is less than 4 mA.

One way in which flow computation is done in industries such as the process control industry and the petroleum industry is through the use of dedicated flow computers. Such devices either use separate pressure, differential pressure and temperature transmitters or have sensing mechanisms housed in large enclosures. These devices are generally large and consume more power than 4 mA. Additionally, they are often limited to use in specialized applications such as the monitoring of hydrocarbons for custody transfer or at wellheads to monitor the output of gas or oil wells.

Another way in which flow computation is done is through the use of local control systems, often called programmable loop controllers (PLC). PLC's typically receive inputs from separate pressure, differential pressure and temperature transmitters and compute the flow based on these inputs. Such devices are often performing additional local control tasks such as the calculation of other variables required in the control of the plant or the monitoring of process variables for alarm purposes. The calculation of flow in these devices requires programming by the user.

A third way in which flow computation is done is through the use of large computers which control entire plants, often called distributed control systems (DCS). DCS's typically perform a wide range of tasks ranging from receiving inputs from field-based transmitters to computing the intermediate process variables such as flow or level, to sending positioning signals to final control elements such as valves, to performing the monitoring and alarm functions within the plant. Because of the wide range of tasks required and the typically high cost of DCS input/output capability, memory and computational time, it is common to do a flow computation that is not compensated for all of the effects due to changing process conditions.

One common means of measuring flow rate in the process control industry is to measure the pressure drop across a fixed restriction in the pipe, often referred to as a differential producer or primary element. The general equation for calculating flow rate through a differential producer can be written as:

$$Q = NC_d EY_1 d^2 \sqrt{\rho h} \qquad \text{Equation 1}$$

where

Q=Mass flow rate (mass/unit time)

N=Units conversion factor (units vary)

$C_d$=Discharge coefficient (dimensionless)

E=Velocity of approach factor (dimensionless)

$Y_1$=Gas expansion factor (dimensionless)

d=Bore of differential producer (length)

ρ=Fluid density (mass/unit volume)

h=Differential pressure (force/unit area)

Of the terms in this expression, only the units conversion factor, which is a constant, is simple to calculate. The other terms are expressed by equations that range from relatively simple to very complex. Some of the expressions contain many terms and require the raising of numbers to non-integer powers. This is a computationally intensive operation.

In addition, it is desirable to have the transmitter operate compatibly with as many types of differential producers as possible. Implementing all of the calculations and equations needed for the conventional flow equation in order to determine flow based on the output of one differential producer (much less a plurality of different types of differential producers) requires computations which can only be reasonably performed by a processor which has a high calculation speed and which is quite powerful. Operation of such a processor results in increased power consumption and memory requirements in the transmitter. This is highly undesirable given the 4 mA power constraint or conventional transmitters. Therefore, current transmitter-based microprocessors, given the above power and memory constraints, simply do not have the capability of performing the calculations in any reasonable time period.

There has been some work done in obtaining a simplified discharge coefficient equation. However, this is only one small part of the flow equation. Even assuming the discharge coefficient is extremely simplified, implementing the flow equation accurately is still very difficult given the constraints on current transmitter-based microprocessors.

Other attempts have been made to simplify the entire flow equation. However, in order to make the flow equation simple enough that it can be implemented in transmitter-based microprocessors, the simplified flow equations are simply not very accurate. For example, some such simplified flow equations do not account for the discharge coefficient. Others do not account for compressibility, or viscosity effects.

Therefore, common transmitter-based microprocessors which are powered by the 4–20 mA loop simply do not accurately calculate flow. Rather, they provide outputs indicative of differential pressure across the orifice plate, static line pressure, and temperature. These variables are provided to a flow computer in a control room as mentioned above, which, in turn, calculates flow. This is a significant processing burden on the flow computer.

SUMMARY OF THE INVENTION

A transmitter provides an output signal indicative of mass flow rate of fluid through a conduit. The transmitter includes a temperature sensor providing a temperature signal indicative of fluid temperature. A static pressure sensor provides a static pressure signal indicative of static pressure in the conduit. A differential producer provides a differential pressure signal. The transmitter also includes a controller which provides the output signal indicative of mass flow of the fluid through the conduit based on a plurality of simplified equations.

BRIEF DESCRIPTION OF THE DRAWINGS

FIG. 2 is a block diagram, in partial schematic form of the transmitter according to the present invention.

FIGS. 3A–3C graphically illustrate curve fit accuracy for the discharge coefficient used by the system according to the present invention.

FIG. 5 illustrates the curve fit accuracy of the term $Ed^2$ used according to the present invention.

DETAILED DESCRIPTION OF THE PREFERRED EMBODIMENTS

Figure 1:
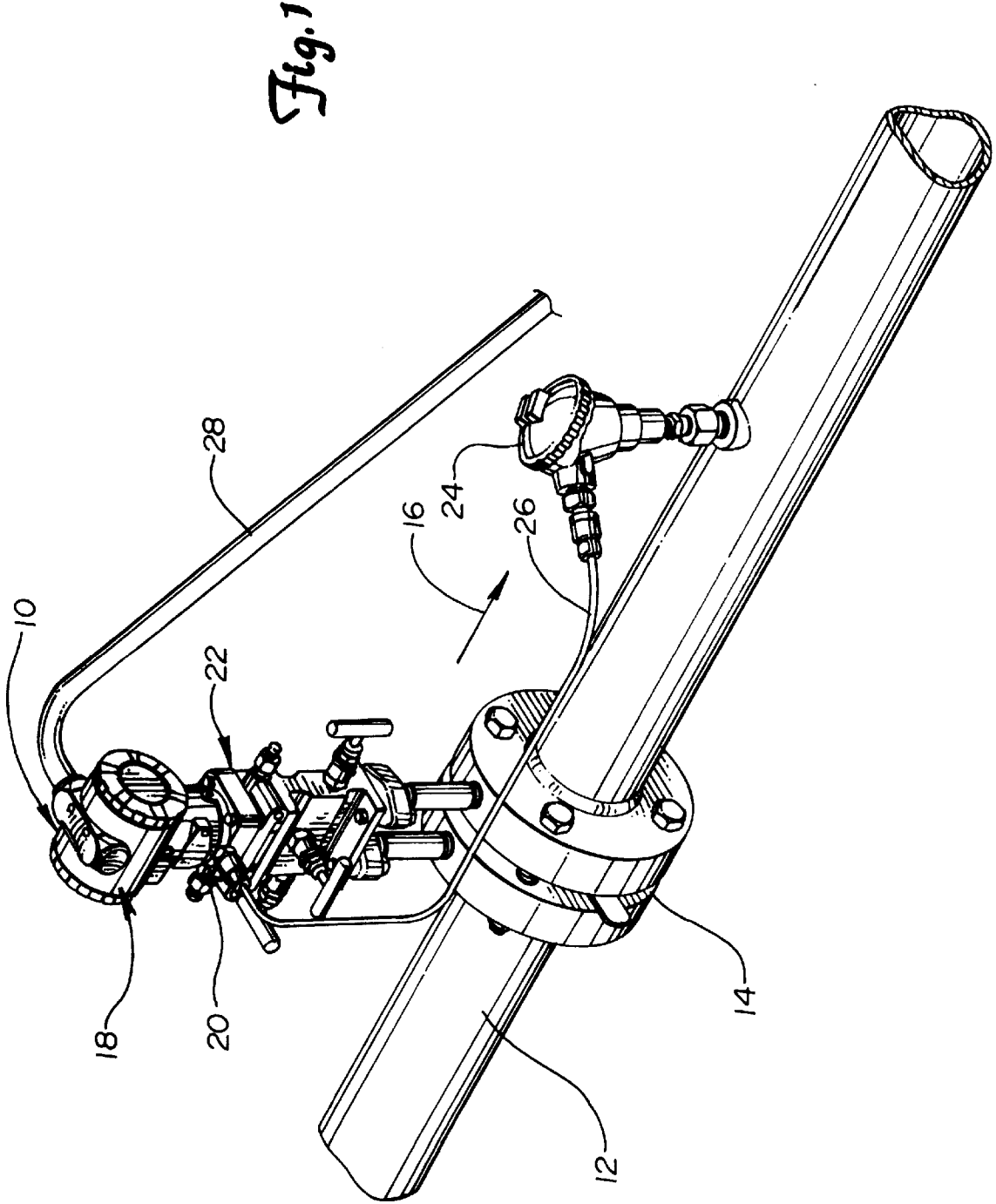
FIG. 1 shows a transmitter according to the present invention connected to a pipe which conducts fluid therethrough.

FIG. 1 is an illustration of a transmitter 10 according to the present invention. Transmitter 10 is coupled to a pipe 12 through pipe fitting or flange 14. Pipe 12 conducts flow of a fluid, either a gas or a liquid, in the direction indicated by arrow 16.

Transmitter 10 includes transmitter electronics module 18 and sensor module 22 which collectively house a transmitter more fully illustrated in FIG. 2. Transmitter electronics module 18 also preferably includes a boss 20 for accepting an input from a resistive temperature device (RTD), preferably a 100 ohm RTD which is typically inserted directly into the pipe or into a thermowell which is inserted into the pipe to measure the fluid temperature. The wires from the RTD are connected to one side of a terminal block in a temperature sensor housing 24. To the other side of the terminal block are connected wires which run through an electrical conduit 26 and are coupled to boss 20.

Sensor module 22 includes a differential pressure sensor and an absolute pressure sensor. The differential pressure sensor and absolute pressure sensor provide pressure signals to conditioning and digitizing circuitry, and to a linearizing and compensating circuit. The compensated, linearized and digitized signals are provided to the electronics module 18. The electronics module 18 in transmitter 10 provides an output signal indicative of process conditions of the process fluid flowing through pipe 12 to a remote location, by a 4–20 mA two-wire loop preferably formed using twisted pair conductors, through flexible conduit 28. In the preferred embodiment, transmitter 10 provides signals which are indicative of the three process variables (temperature, static pressure, and differential pressure) according to the HART® or Fieldbus Standards. Further, in accordance with the present invention, transmitter 10 also provides an output signal indicative of flow. The method of determining flow according to the present invention is significantly simplified over prior methods allowing the microprocessor in the electronics module of transmitter 10 to calculate flow without exceeding the power constraints on the microprocessor, and at acceptably fast update times.

FIG. 2 is a more detailed block diagram of sensor module 22 and electronics module 18 of transmitter 10. Sensor module 22 includes a strain gauge pressure sensor 30, differential pressure sensor 32 and temperature sensor 34. Strain gauge sensor 30 senses the line pressure (or static pressure) of fluid flowing through conduit 12. Differential pressure sensor 32 is preferably formed as a metal cell capacitance-based differential pressure sensor which senses the differential pressure across an orifice in conduit 12. Temperature sensor 34, as discussed above, is preferably a 100 ohm RTD sensor which senses a process temperature of fluid in pipe 12. While, in FIG. 1, sensor 34 and sensor housing 24 are shown downstream of transmitter 10, this is but one preferred embodiment, and any suitable placement of temperature sensor 34 is contemplated.

Sensor module 22 also preferably includes an analog electronics portion 36, and a sensor processor electronics portion 38. Electronics module 18 includes output electronics portion 40. Analog electronics portion 36 in sensor module 22 includes signal conditioning and power supply filtering circuitry 42, analog-to-digital (A/D) circuitry 44, and PRT 46. The analog signals received from sensors 30, 32 and 34 are provided to analog signal conditioning and power supply filtering circuitry 42. The analog signals are conditioned (such as amplified) and the conditioned analog signals are provided to A/D converter circuitry 44.

In a preferred embodiment, A/D converter circuitry 44 includes a plurality of voltage-to-digital converters, or capacitance-to-digital converters, or both (as appropriate) which digitize the analog input signals. Such converters are preferably constructed according to the teachings of U.S. Pat. Nos. 4,878,012; 5,083,091; 5,119,033 and 5,155,455; assigned to the same assignee as the present invention, and hereby incorporated by reference. In the embodiment shown in FIG. 2, three voltage-to-digital converters 48, 50 and 52, and one capacitance-to-digital converter 54 are shown. The voltage-to-digital converters 48 and 50 are used to convert the signals from sensors 30 and 34 into digital signals. The capacitance-to-digital converter 54 is used to convert the signal from capacitive pressure sensor 32 to a digital signal.

PRT 46 is preferably formed as a low cost, silicon-based PRT positioned proximate pressure sensors 30 and 32. PRT 46 provides a temperature signal indicative of the temperature proximate sensors 30 and 32. This temperature signal is provided to voltage-to-digital converter 52 where it is digitized. This digitized signal is then used to compensate the differential and line pressure signals for temperature variations. Analog signal conditioning and power supply filtering circuitry 42, the A/D converters 44 and PRT 46 are all preferably physically located proximate to, or on, a single circuit board housed in transmitter 10.

Once the analog signals are digitized by A/D converters 44, the digitized signals are provided to sensor processor electronics portion 38 as four respective sixteen bit wide outputs on any suitable connection or bus 56.

Sensor processor electronics portion 38 preferably includes a microprocessor 58, clock circuitry 60 and memory (preferably electrically erasable programmable read only memory, EEPROM) 62. Microprocessor 58 compensates and linearizes the process variables received from analog electronics portion 36 for various sources of errors and non-linearity. For instance, during manufacture of transmitter 10, pressure sensors 30 and 32 are individually characterized over temperature and pressure ranges, and appropriate correction constants are determined. These correction constants are stored in EEPROM 62. During operation of transmitter 10, the constants in EEPROM 62 are retrieved by microprocessor 58 and are used by microprocessor 58 in calculating polynomials which are, in turn, used to compensate the digitized differential pressure and static pressure signals.

Clock circuitry 60 is provided in sensor processor electronics portion 38 and provides clock signals to microprocessor 58, A/D circuits 44 and to other electronics as appropriate, in order to accomplish the desired operations. It should also be noted that the functionality of portions 36 and 38 can be combined into a single integrated circuit chip through application specific integrated circuit (ASIC) technology.

After the analog signals from sensors 30, 32 and 34 are digitized, compensated and corrected, the process variable signals are provided over a serial peripheral interface (SPI) bus 64 to output electronics portion 40 in electronics module 18. SPI bus 64 preferably includes power signals, two hand shaking signals and the three signals necessary for typical SPI signaling.

Output electronics module 40 preferably includes microprocessor 66, non-volatile memory 68, voltage regulator 72, modulator circuit 74, HART® protocol receiver 76 and loop current controller 78. In addition, output electronics portion 40 may optionally be coupled to a battery back-up circuit which provides battery power to the output electronics in case of failure of the power provided over the two-wire loop.

Microprocessor 66 receives the digitized, compensated process variables over SPI bus 64. In response, and as will be described in greater detail later in this specification, microprocessor 66 calculates the mass flow of fluid flowing through pipe 12 based on the process variables received over bus 64. This information is stored in non-volatile memory 68 which, preferably, is suitable for storing up to 35 days worth of mass flow data.

When requested, microprocessor 66 configures output electronics 40 to provide the mass flow data stored in non-volatile memory 68 over two-wire loop 82. Therefore, output electronics 40 is coupled at positive and negative terminals 84 and 86 to loop 82 which includes controller 88 (modeled as a power supply and a resistor). In the preferred embodiment, output electronics 40 communicates over two-wire loop 82 according to a HART® communications protocol, wherein controller 88 is configured as a master and transmitter 10 is configured as a slave. Other communications protocols common to the process control industry may be used, with appropriate modifications to the code used with microprocessor 66 and to the encoding circuitry. Communication using the HART® protocol is accomplished by utilizing HART® receiver 76. HART® receiver 76 extracts digital signals received over loop 82 from controller 88 and provides the digital signals to circuit 74 which, in turn, demodulates the signals according to the HART® protocol and provides them to microprocessor 66.

Circuit 74 receives digital signals (which are to be sent over loop 82) from microprocessor 66. Circuit 74 converts the digital signals into analog signals, modulates them for transmission, and provides the modulated signals to circuit 76. Circuit 74 preferably includes a Bell 22 compatible modem. The loop current control circuit 78 receives an analog voltage signal from a D/A converter in circuit 74. In response, loop current control circuit 78 provides a 4–20 mA output representative of the particular information being transmitted by microprocessor 66 over loop 82 (such as one of the process variables, or the calculated flow).

Also, voltage regulator 72 preferably provides 3.5 volts and other suitable reference voltages to output electronics circuity 40, sensor processor electronics 38, and analog electronics 36.

In order to calculate flow through a differential producer (such as an orifice plate) information is required about three things. Information is required about the process conditions, about the geometry of the differential producer and about the physical properties of the fluid. Information about the process conditions is obtained from sensor signals, such as the signals from sensors 30, 32 and 34. Information regarding the geometry of the differential producer and the physical properties of the fluid are provided by the user.

Flow through a differential producer is conventionally calculated by utilizing the equation set out as Equation 1 above. Flow is typically calculated in mass units, but can be expressed in volumetric units if required. The choice of units determines the value of the units conversion factor, N.

The discharge coefficient, $C_d$, is a dimensionless, empirical factor which corrects theoretical flow for the influence of the velocity profile of the fluid in the pipe, the assumption of zero energy loss in the pipe, and the location of pressure taps. $C_d$ is related to the geometry of the differential producer and can be expressed as a seemingly simple relationship in the following form:

$$C_d = C_\infty + \frac{b}{Re_D^n} \qquad \text{Equation 2}$$

where the Reynolds number $$Re_D^n = \frac{KQ}{\mu D};$$

$C_{2S}$=the discharge coefficient at infinite Reynolds number;

b=a known Reynolds number correction term;

n=a known exponent term; and $\mu$=the fluid viscosity.

This relationship varies for different types of differential producers, the location of the pressure taps on such producers, and the beta ratio. Typical equations defining $C_d$ and the other above terms have a wide range of complexity and are set out in Table 1. The calculation for $C_d$ associated with an orifice plate-type differential producer is the most common in the industry.

The velocity of approach factor, E, is a geometrical term and relates the fluid velocity in the throat of the differential producer to that in the remainder of the pipe. The velocity of approach factor is a function of temperature as follows:

$$E = \frac{1}{\sqrt{1-\beta^4}} \qquad \text{Equation 3}$$

where, for an orifice meter, $$\beta = \frac{d_r[1+\alpha_1(T-T_r)]}{D_r[1+\alpha_2(T-T_r)]} \qquad \text{Equation 4}$$

$d_r$=orifice diameter at reference temperature $T_r$;
$D_r$=meter tube diameter at reference temperature $T_r$;
$\alpha_1$=thermal expansion coefficient of the orifice plate; and
$\alpha_2$=thermal expansion coefficient of a meter tube.

The gas expansion factor $Y_1$ is a dimensionless factor which is related to geometry, the physical properties of the fluid and the process conditions. The gas expansion factor accounts for density changes as the fluid passes through a differential producer. The gas expansion factor for primary elements with abrupt changes in diameter, such as orifice meters, is given by the following empirical relationship:

$$Y_1 = 1 - (.41 + 35\beta^4)\frac{h}{27.73PK} \qquad \text{Equation 5}$$

where h=differential pressure in inches of water at 68° F.;
P=upstream pressure in psia; and
K=isentropic exponent of the gas.

The adiabatic gas expansion factor for contoured elements is described as follows:

$$Y_1 = \left[\frac{(1-\beta^4)[K/K-1](P_2/P_1)^{2/K}[1-(P_2/P_1)^{(K-1/K)}]}{[1-\beta^4(P_2/P_1)^{(2/K)}](1-P_2/P_1)}\right]^{1/2} \qquad \text{Equation 6}$$

where $$\frac{P_2}{P_1} = 1 - \frac{h}{27.73P} \qquad \text{Equation 7}$$

K=isentropic exponent of the gas.
The value of $Y_1$ is 1.0 for liquids.
The bore of the differential producer, d, is related to geometry and is a function of temperature as follows:

$$d = d_r[1+\alpha_1(T-T_r)] \qquad \text{Equation 8}$$

The differential pressure factor, h, is measured by a conventional differential pressure sensor.

The fluid density factor ρ is described in mass per unit volume and is a physical property of the fluid. For typical process control applications, the density of liquids is a function of temperature only. It can be described by expressions such as the PTB equation for the density of water:

$$\rho = A + BT + CT^2 + DT^3 + ET^4 + FT^5 \qquad \text{Equation 9}$$

where A–F are constants, or a generic expression given by the American Institute of Chemical Engineers (AIChE):

$$\rho = \frac{aM}{b^{1+(1-T/C)^d}} \qquad \text{Equation 10}$$

Where a–d are fluid dependent constants and M is the molecular weight.

Gas density is a function of absolute pressure and absolute temperature given by the real gas law:

$$\rho = \frac{P}{nZR_oT} \qquad \text{Equation 11}$$

where Z the compressibility factor;
$R_o$=universal gas constant; and
n=number of moles.

Gas density and compressibility factors are calculated using equations of state. Some equations of state, such as AGA8, the ASME steam equation and MBWR, are useful for single fluids or a restricted number of fluids. Others, such as Redlich-Kwong or AIChE equations of state are generic in nature and can be used for a large number of fluids. The AIChE equation is as follows:

$$\rho = M\left[-\frac{1}{2B} - \frac{1}{2}\left[\frac{1}{B^2}4\frac{P}{BRT}\right]^{1/2}\right] \qquad \text{Equation 12}$$

where $$B = a + \frac{b}{T} + \frac{c}{T^3} + \frac{d}{T^8} + \frac{e}{T^9} \qquad \text{Equation 13}$$

where a–e are fluid dependent constants; and
M=the molecular weight of the fluid.

Implementing the flow calculation using equations 1–13 set out above would yield a highly accurate result. However, the constraints of power consumption, calculation speed and memory requirements make the implementation of the full equations beyond the capability of currently available transmitter based microprocessors. Therefore, the transmitter of the present invention calculates flow based on a number of simplified equations, while retaining a high degree of accuracy in the flow calculation.

The dependencies related to the discharge coefficient are as follows:
$C_d$ (β, $Re_D$);
$Re_D$ (Q, μ) where μ is the viscosity of the fluid; and
μ (T)

Using the AIChE equation for liquids:

$$\mu = \exp(a + b/T + c\,\text{Ln}(T) + d\,T^e); \qquad \text{Equation 14}$$

and, using AIChE equation for gases:

$$\mu = \frac{aT^b}{1 + c/T + d/T^2} \qquad \text{Equation 15}$$

According to the present invention, the discharge coefficient $C_d$ equation is simplified by approximating $\mu^{-1}$ by a polynomial in T or 1/T. Preferably, this approximation is done using a third degree polynomial equation. Also, $C_d$ is approximated using a sixth degree polynomial equation in $$\frac{1}{\sqrt{Re_D}}$$

or $$\frac{1}{Ln(Re_D)}$$

It has been observed that better accuracy is obtained using the polynomial for $C_d$ with the term $$\frac{1}{Ln(Re_D)}$$

being the independent variable, but this also increases the calculation time. Therefore, this can be used, or the other polynomial can be used, depending upon the degree of accuracy desired.

Figure 3A:
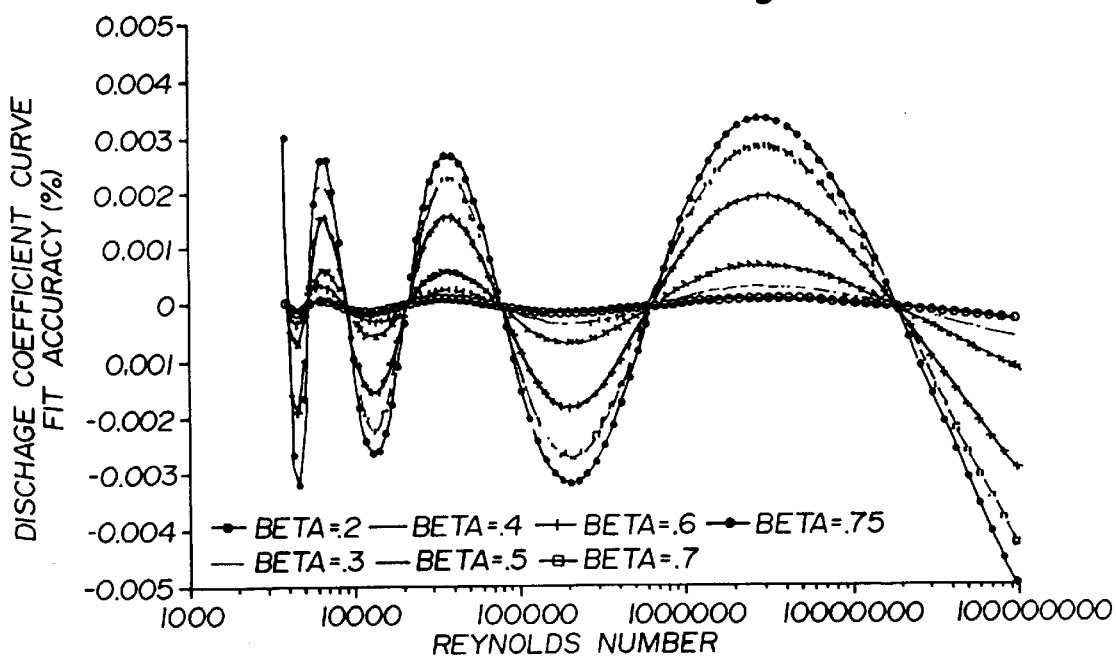
Figure 3B:
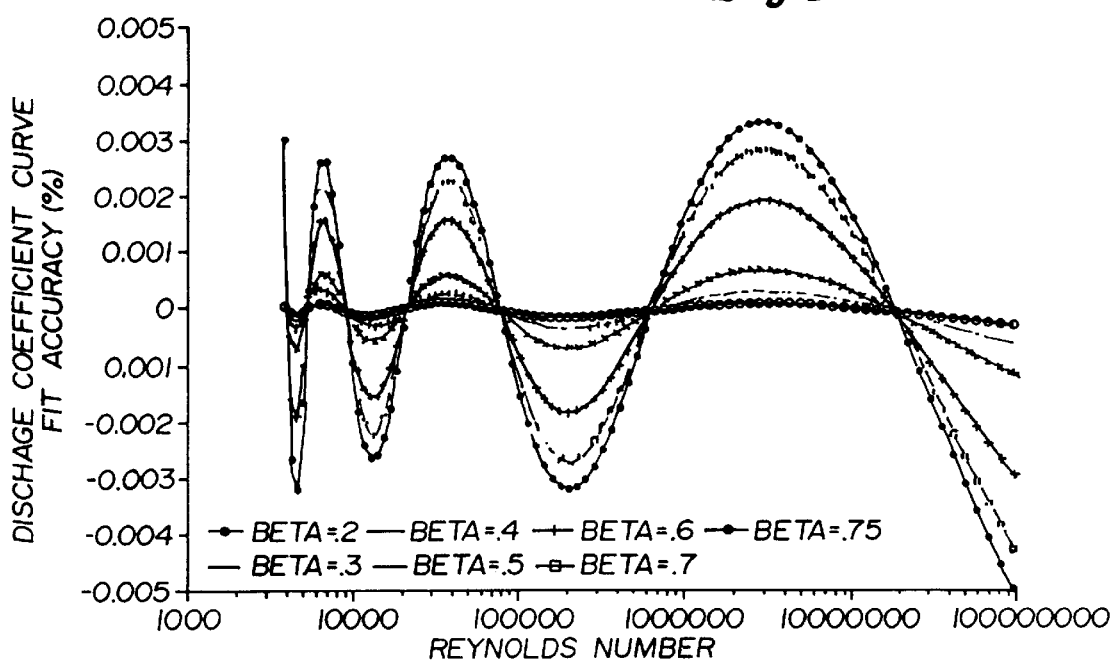

FIGS. 3A, 3B and 3C are examples of curve fit accuracy of the discharge coefficient using the above equations. FIG. 3A is a graph of the discharge coefficient curve fit error versus the Reynolds number for an ASME flange tap orifice meter having a diameter in excess of 2.3 inches. This graph was obtained by doing a sixth degree fit in $$\frac{1}{\sqrt{Re_D}}$$

as follows:

$$C_d = b_0 + \frac{1}{\sqrt{Re_D}}\left(b_1 + \frac{1}{\sqrt{Re_D}}\left(b_2 + \frac{1}{\sqrt{Re_D}}\left(b_3 + \frac{1}{\sqrt{Re_D}}\left(b_4 + \frac{1}{\sqrt{Re_D}}\left(b_5 + \frac{b_6}{\sqrt{Re_D}}\right)\right)\right)\right)\right)$$

Equation 16 and using an approximation of viscosity as follows:

$$\mu^{-1} = a_0 + \frac{1}{T}\left(a_1 + \frac{1}{T}\left(a_2 + a_3\frac{1}{T}\right)\right)$$

Equation 17

FIG. 3B graphically illustrates the discharge coefficient curve fit error plotted against Reynolds number for an ASME corner tap orifice meter using a sixth degree fit in $$\frac{1}{\sqrt{Re_D}}$$

FIG. 3C graphically illustrates the discharge coefficient curve fit error against Reynolds number for an ASME long radius nozzle using the sixth degree fit in $$\frac{1}{\sqrt{Re_D}}$$

FIGS. 3A–3C illustrate that the curve fit approach approximates the discharge coefficient $C_d$ to better than +/−0.005%. Similar results are obtained for other differential producers.

Figure 4A:
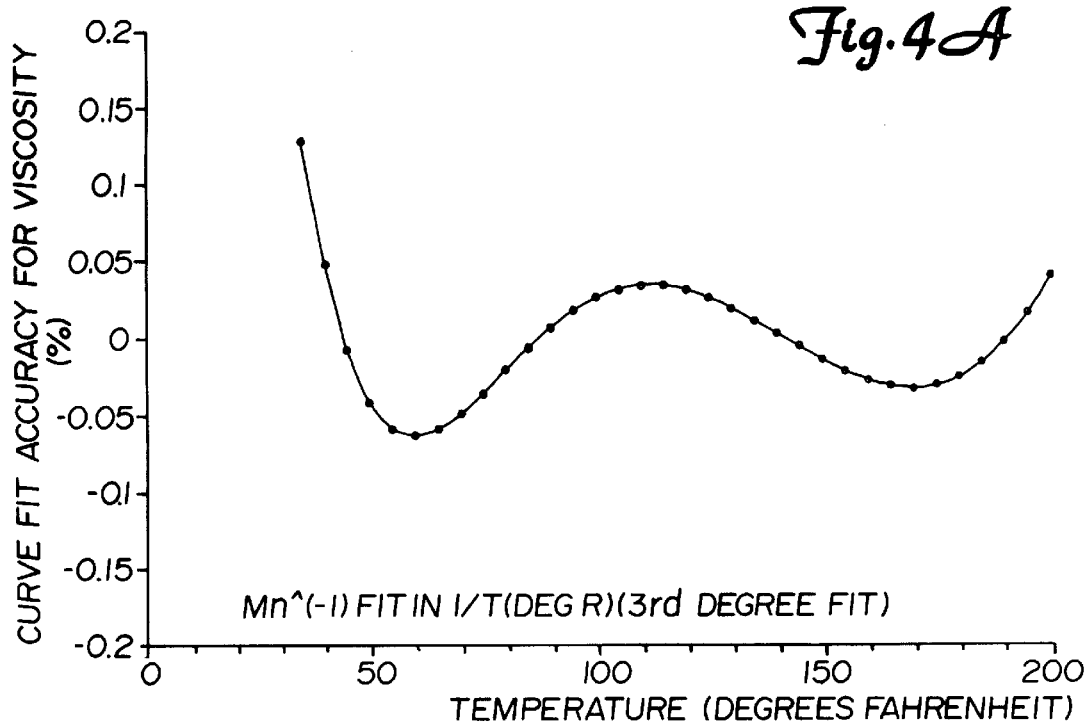
FIGS. 4A and 4B graphically illustrate curve fit accuracy of viscosity used according to the present invention.
Figure 4B:
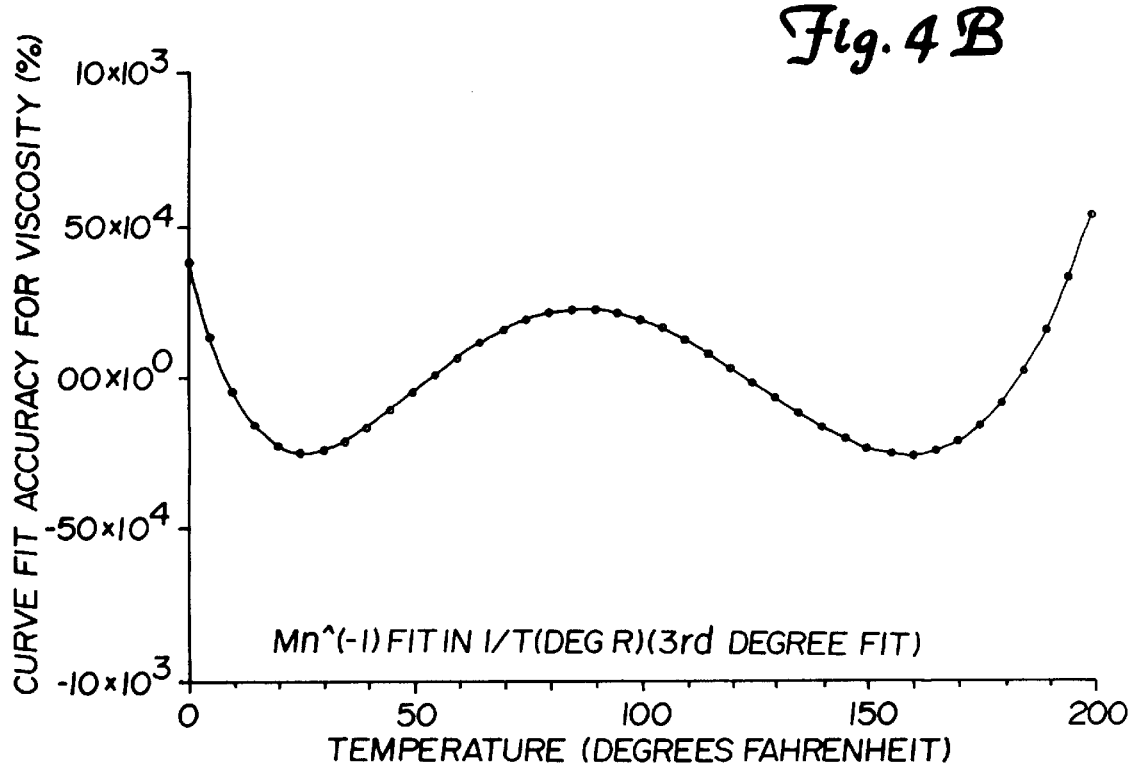

FIGS. 4A and 4B are examples of curve fit accuracy obtained for viscosity. FIG. 4A graphically illustrates curve fit accuracy for viscosity versus temperature using a third degree polynomial fit in 1/T. FIG. 4B illustrates the curve fit accuracy for viscosity versus temperature using a third degree polynomial fit in 1/T. FIG. 4A is based on water and FIG. 4B is calculated for air. It is seen that the curve fit approach approximates the viscosity of air to better than +/−0.001% and the viscosity of water to better than +/−0.2%. A polynomial fit of a higher degree in 1/T, such as 4 or 5, would improve the accuracy of the fit for water. Because the discharge coefficient, $C_d$, is weakly dependent on Reynolds number and, thus, viscosity, the accuracy provided using a third degree polynomial fit in 1/T is acceptable and the added computational complexity of a higher degree polynomial approximation is not necessary. Similar results are obtained for other liquids and gases.

The dependencies related to the velocity of approach factor, E, and the bore of the differential producer, d, are as follows:

$E(T)$, and $d^2(T)$

The method of the present invention simplifies the $Ed^2$ calculation by grouping E and $d^2$ together and approximating the product of $Ed^2$ by a polynomial in T or 1/T. This polynomial is preferably a second degree polynomial.

FIG. 5 is an example of the curve fit accuracy of the $Ed^2$ term. FIG. 5 graphically illustrates the accuracy of this term plotted against temperature using a second degree polynomial in T as follows:

$$Ed^2 = c_0\frac{1}{T}\left(c_1 + \frac{1}{T}c_2\right)$$

Equation 18

FIG. 5 illustrates that the curve fit approach approximates the $Ed^2$ term to better than +/−0.00002%.

The dependencies of the gas expansion factor, $Y_1$, are as follows:

$Y_1(\beta, K, h/p)$; and $Y_1(T)$

Simplifying the gas expansion factor calculation is accomplished by ignoring the dependency on T. The $Y_1$ term is approximated using a polynomial equation in h/P where h is the differential pressure and P is the static pressure. Preferably, this polynomial is a second degree polynomial. For an orifice, a linear relationship exists between $Y_1$ and h/P.

Figure 6:
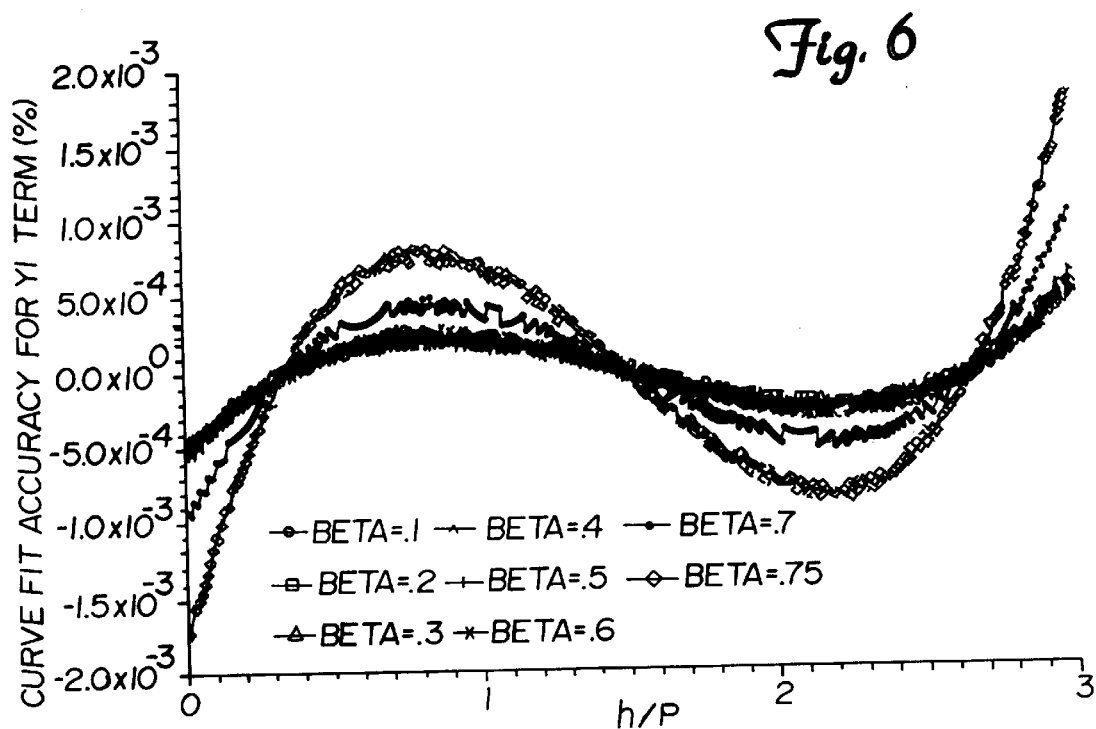
FIG. 6 graphically illustrates the curve fit accuracy of the gas expansion factor used according to the present invention.

FIG. 6 is an example of curve fit accuracy of $Y_1$ versus temperature using a second degree polynomial fit in h/P as follows:

$$Y_1 = d_0 + \frac{h}{p}\left(d_1 + \frac{h}{P}d_2\right)$$

Equation 19

The curve is illustrated for a contoured element differential producer. FIG. 6 illustrates that the term $Y_1$ for contoured elements is accurate, using the system according to the present invention, to better than +/−0.002% for all beta ratios. Accuracy is better than +/−0.0005% for beta ratios less than 0.6. Similar results are obtained for the square edged orifice.

Dependencies related to the fluid density for liquid and gas are as follows:

$\rho_{Liq}(T)$; and $\rho_{Gas}(P, T)$, specifically $\rho_{Gas} = \left(\frac{P}{RT}\right)\frac{1}{Z}$ The fluid density calculation for liquid is simplified according to the present invention by providing two levels of curve fit. The term $\sqrt{\rho_{liq}}$ is approximated by a polynomial in T or 1/T. Preferably, this is a third degree polynomial and is provided as a default equation for a lower accuracy fit as follows:

$$\sqrt{\rho} = e_0 + \frac{1}{T}\left(e_1 + \frac{1}{T}\left(e_2 + \frac{1}{T}e_3\right)\right) \qquad \text{Equation 20}$$

The same term is also preferably approximated by a polynomial in 1/T using a fifth degree polynomial as a higher accuracy fit for broader operating ranges of temperature.

Simplifying the calculation for fluid density for gas is accomplished by, again providing two levels of curve fit. Fitting a curve to $1/\sqrt{z}$ and not $\rho_{Gas}$ improves the curve fit accuracy, reduces calculation time, and improves the simplified flow equation accuracy. According to the present invention, the term $1/\sqrt{z}$ is approximated by a polynomial in P and 1/T. In the preferred embodiment, the default polynomial is a 3×2 polynomial and is used for a lower accuracy fit. However, the term $1/\sqrt{z}$ can also be approximated by a polynomial in P and 1/T using an 8×6 polynomial for higher accuracy fits, and for broader operating ranges of both P and T. The preferred simplified equation for fluid density for all gases is as follows:

$$\sqrt{\rho} = \left[\frac{144M_w}{R}\right]^{.5}\left[\frac{P}{T}\right]^{.5}\left[f_0 + P(f_1 + P(f_2 + pf_3)) + \frac{1}{T}\left((f_4 + P(f_5 + P(f_6 + Pf_7))) + \frac{1}{T}(f_8 + P(f_9 + P(f_{10} + Pf_{11})))\right)\right] \qquad \text{Equation 21}$$

Figure 7A:
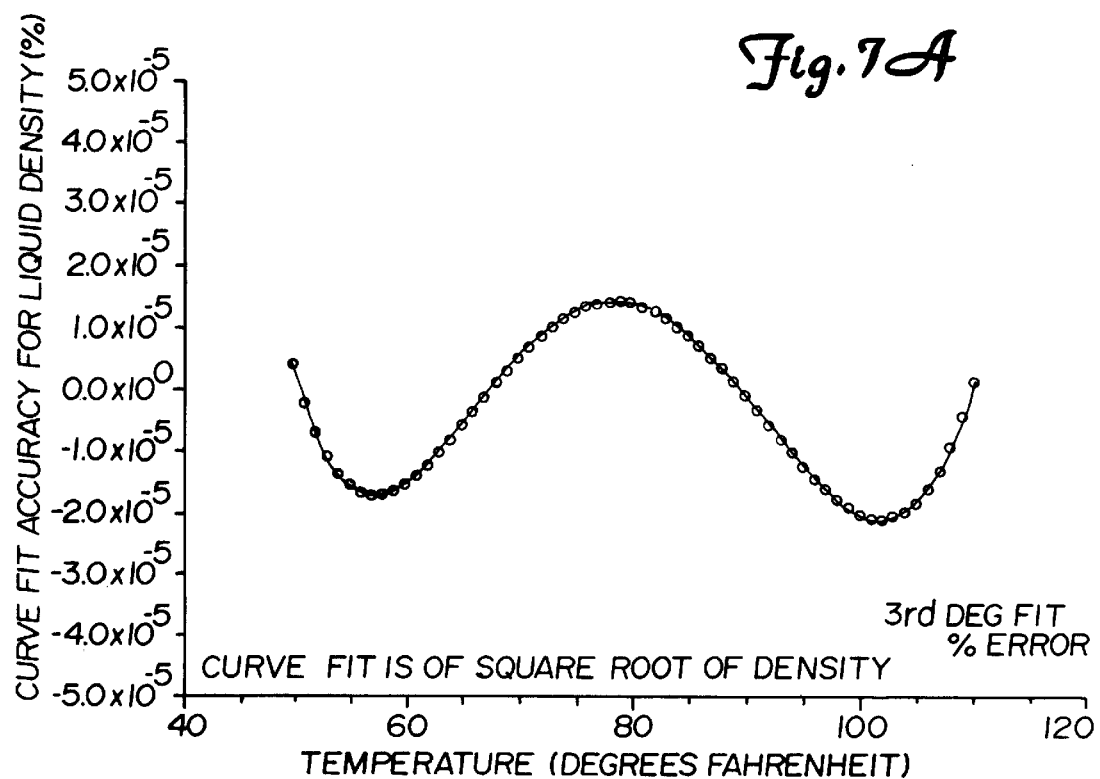
FIGS. 7A and 7B graphically illustrate the curve fit accuracy of fluid density for liquid used according to the present invention.
Figure 7B:
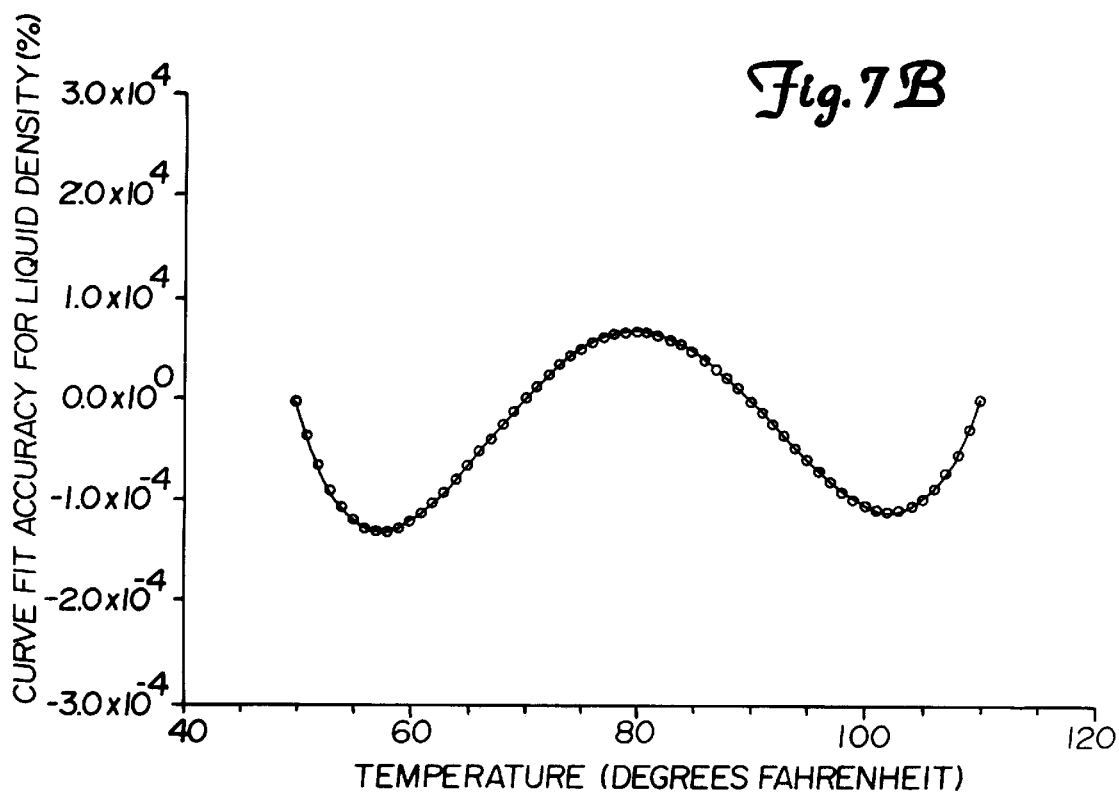

FIG. 7A graphically illustrates an example of curve fit accuracy for $\sqrt{\rho_{liq}}$ for water versus temperature using the third degree polynomial fit in 1/T. FIG. 7B graphically illustrates curve fit accuracy density of acrylonitrile versus temperature. In both cases, the temperature range is 50° F. to 110° F. FIGS. 7A and 7B illustrate that the curve fit approach approximates $\sqrt{\rho_{liq}}$ to better than +/−0.0002% for these two liquids and the selected temperature range. Similar results are obtained for other liquids and other temperature ranges.

Figure 8A:
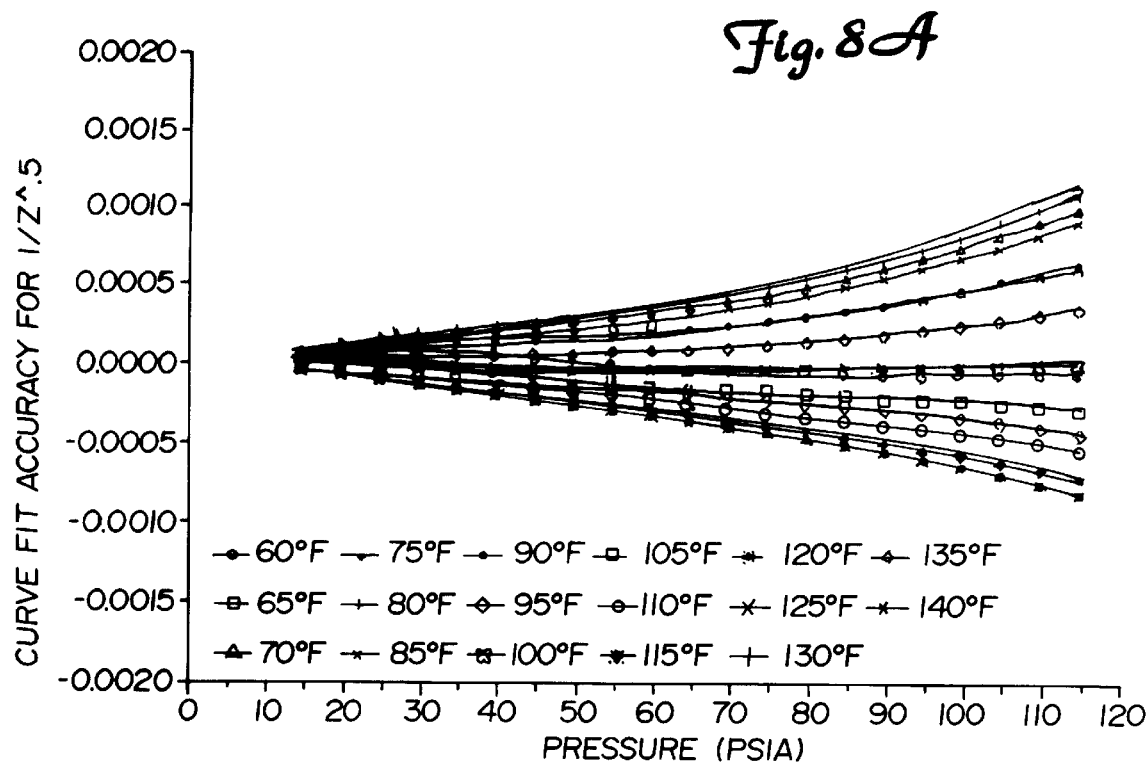
FIGS. 8A and 8B graphically illustrate curve fit accuracy of fluid density for gas used according to the present invention.
Figure 8B:
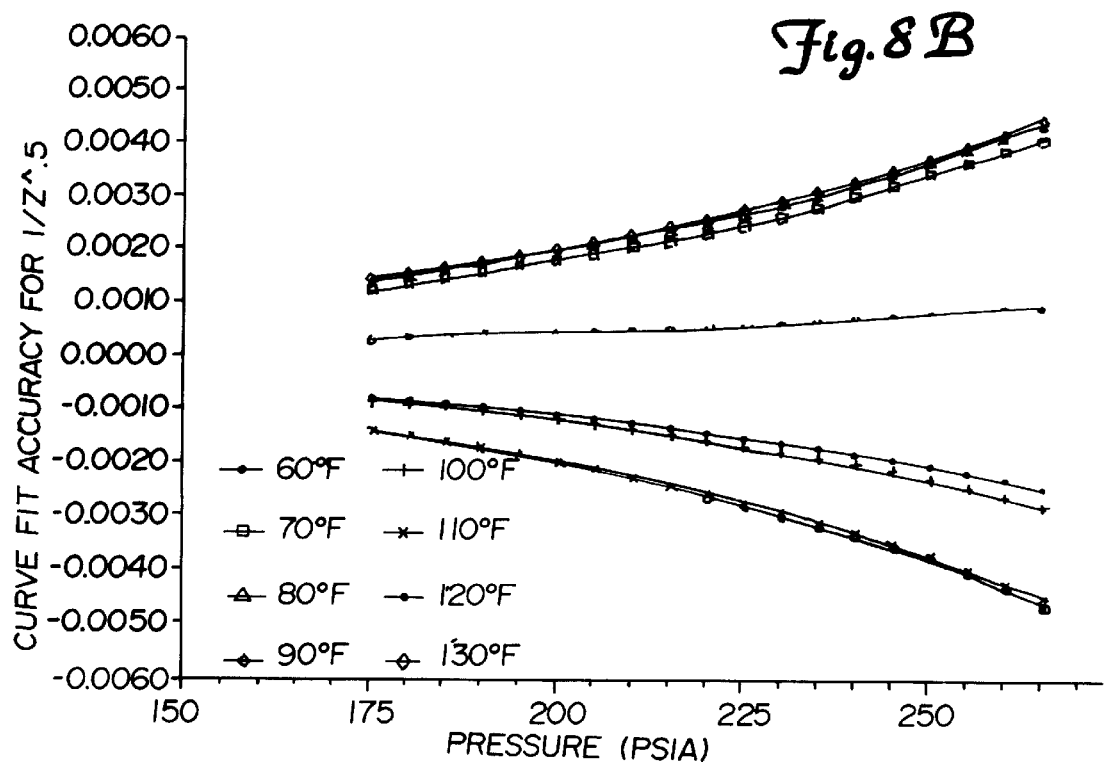

FIGS. 8A and 8B illustrate examples of curve fit accuracy for $1/\sqrt{z}$ for two fluids and pressure temperature ranges. FIG. 8A illustrates the curve fit accuracy using the 3×2 polynomial fit for carbon dioxide gas. The pressure and temperature ranges are 15 psia to 115 psia and 60° F. to 140° F. The results show that the curve fit approach accurately approximates $1/\sqrt{z}$ to better than +/−0.0015%. FIG. 8B illustrates the curve fit accuracy using the 3×2 polynomial fit for ethylene gas. The pressure and temperature ranges are 75 psia to 265 psia and 60° F. to 140° F. The results show that the curve fit approach accurately approximates $1/\sqrt{z}$ to better then +/−0.005%. As these results indicate, the accuracy of the curve fit approximation varies, as the fluid is changed and as the operating ranges of pressure and/or temperature change. When the operating ranges of pressure and/or temperature result in unacceptable approximations by using a 3×2 polynomial, an 8×6 polynomial will improve the results to levels similar to those indicated in FIGS. 8A and 8B.

In sum, the classic flow calculation given by Equation 1 above, is simplified according to the present invention as follows:

$$Q = N[C_d][Ed^2][Y_1][\sqrt{\rho}]\sqrt{h} \qquad \text{Equation 22}$$

For gases this equation can be rewritten as:

$$Q = KN[C_d][Ed^2][Y_1]\left[\frac{1}{\sqrt{z}}\right]\sqrt{\frac{hP}{T}}$$

where $$K = \sqrt{\frac{144M}{R}}$$

M=molecular weight of the gas;
R=gas constant; and
P, h, T are in units of psia, inches of water and degrees Rankine, respectively. For liquids, the equation can be rewritten as:

$$Q = N[C_d][Ed^2][Y_1][\sqrt{\rho}]\sqrt{h}$$

where the bracketed terms are curve fit approximations. By simplifying the flow equation as set out above, the transmitter based microprocessor 66 is capable of updating the flow calculation each time it receives updated sensor information by bus 64. In the event that one or more of the curve fit approximations have not been completely calculated the previous value is used in the flow calculation.

The effect of variations in the process variables has a direct affect on the flow calculation by virtue of their appearance in the flow equation. They have a smaller effect on the curve fit terms. Thus, by using the newly updated process variable information and the most recently calculated curve fit approximations, the result is a flow calculation that is both fast and accurate. Having newly calculated flow terms at such an expedient update rate allows transmitter 10 to exploit fast digital communication protocols.

Also, by simplifying the flow calculation as set out above, microprocessor 66 performs the same calculations regardless of the type of differential producer used, regardless of the beta ratio used, and regardless of whether the user requires a simplified or fully compensated flow.

It should also be noted that the curve fit coefficients are easily calculable by the user using known techniques. These coefficients are simply stored in memory associated with microprocessor 66 and used in performing the desired calculations.

These simplifications allow transmitter 10 to actually calculate flow in a highly accurate manner. Rather than requiring the transmitter to simply transmit the process variables back to a control room, and have a flow computer in the control room or installation calculate flow, the transmitter according to the present invention is capable of not only providing the process variables, but also providing a flow calculation to the control room. This relieves the processing overhead on the flow computer or other processor in the control room, yet does not over burden the transmitter-based microprocessor, or require the transmitter-based microprocessor to use energy which exceeds that available to it.

Although the present invention has been described with reference to preferred embodiments, workers skilled in the art will recognize that changes may be made in form and detail without departing from the spirit and scope of the invention.

What is claimed is:

1. A loop powered transmitter for providing an output signal indicative of mass flow rate of fluid through a conduit, the transmitter comprising:
   a temperature receiving circuit configured to receive a temperature signal indicative of fluid temperature;
   a static pressure sensor providing a static pressure signal indicative of static pressure in the conduit;
   a differential pressure sensor providing a differential pressure signal;
   a microcomputing circuit, coupled to the temperature receiving circuit, the static pressure sensor, and the differential pressure sensor, to receive the temperature signal, the static pressure signal and the differential pressure signal, and providing an output signal indicative of flow of the fluid through the conduit;
   wherein the microcomputing circuit calculates flow, Q, according to an equation having multiplicands generally of the form:

$$Q = N[C_d][Ed^2][Y_1][\sqrt{\rho}]\sqrt{h}$$

wherein the microcomputing circuit is configured such that at least two of the multiplicands are each approximated as a function of at least one of the temperature, the static pressure, and differential pressure.

2. The transmitter of claim 1 wherein the microcomputing circuit includes:
   a first microprocessor coupled to the temperature sensor, static pressure sensor and differential pressure sensor, and corrects the static pressure signal, differential pressure signal and temperature signal for non-linearities and provides corrected output signals; and
   a second microprocessor, coupled to the first microprocessor, for calculating flow based on the corrected output signals.

3. The transmitter of claim 1 and further comprising:
   a housing enclosing a portion of the transmitter, and
   a temperature sensor disposed substantially within the housing and coupled to the temperature receiving circuit, sensing the temperature of the fluid and providing the temperature signal.

4. The transmitter of claim 1 and further comprising:
   a housing enclosing a portion of the transmitter, and
   a temperature sensor disposed substantially outside the housing and coupled to the temperature receiving circuit, sensing the temperature of the fluid and providing the temperature signal.

5. The transmitter of claim 1 wherein the transmitter comprises a two wire transmitter.

6. A process control transmitter coupled to a conduit conducting a fluid therethrough, the transmitter comprising:
   a first pressure sensor sensing line pressure in the conduit and providing a line pressure signal indicative of the line pressure;
   a second pressure sensor sensing differential pressure across an orifice in the conduit and providing a differential pressure signal indicative of the differential pressure;
   a temperature receiving circuit configured to receive a temperature signal indicative of a temperature of the fluid;
   a microcomputing circuit, coupled to the first and second pressure sensors and the temperature receiving circuit and powered over a loop, calculating flow of the fluid through the conduit based on the line pressure signal, the differential pressure signal and the temperature signal and providing an output signal indicative of the flow;
   wherein the microcomputing circuit calculates flow, Q, according to an equation having multiplicands generally of the form:

$$Q = N[C_d][Ed^2][Y_1][\sqrt{\rho}]\sqrt{h}$$

and wherein the microcomputing circuit is configured such that at least two of the multiplicands are each approximated as a function of at least one of the temperature, the static pressure, and the differential pressure.

7. The transmitter of claim 6 wherein the microcomputing circuit calculates flow based on an approximation of $C_d$ according to a polynomial equation having the form:

$$C_d = \sum_{i=o}^{n} \left(\frac{1}{\sqrt{Re_D}}\right)^i b_i.$$

8. The transmitter of claim 7 wherein $C_d$ is calculated as:

$$C_d = b_0 + \frac{1}{\sqrt{R\,e_D}}\left(b_1 + \frac{1}{\sqrt{R\,e_D}}\left(b_2 + \frac{1}{\sqrt{R\,e_D}}\left(b_3 + \frac{1}{\sqrt{R\,e_D}}\left(b_4 + \frac{1}{\sqrt{R\,e_D}}\left(b_5 + \frac{b_6}{\sqrt{R\,e_D}}\right)\right)\right)\right)\right).$$

9. The transmitter of claim 6 wherein the microcomputing circuit calculates flow based on an approximation of $Ed^2$ according to a polynomial equation having the form:

$$Ed^2 = \sum_{i=0}^{n} C_i \left(\frac{1}{T}\right)^i.$$

10. The transmitter of claim 9 where $Ed^2$ is calculated as:

$$Ed^2 = c_0 \frac{1}{T}\left(c_1 + \frac{1}{T}c_2\right).$$

11. The transmitter of claim 6 wherein the microcomputing circuit calculates flow based on an approximation of $Y_1$ according to a polynomial equation having the form:

$$Y_1 = \sum_{i=0}^{n} \left(\frac{h}{p}\right)^i d_i.$$

12. The transmitter of claim 11 wherein $Y_1$ is calculated as:

$$Y_1 = d_0 + \frac{h}{p}\left(d_1 + \frac{h}{P}d_2\right).$$

13. The transmitter of claim 6 wherein the microcomputing circuit calculates flow based on an of $\rho$ for liquid according to a polynomial equation having the form:

$$\sqrt{\rho} = \sum_{i=0}^{n} \left(\frac{1}{T}\right)^i e_i.$$

14. The transmitter of claim 13 wherein $\rho$ for liquid is calculated as:

$$\sqrt{\rho} = e_0 + \frac{1}{T}\left(e_1 + \frac{1}{T}\left(e_2 + e_3\frac{1}{T}\right)\right).$$

15. The transmitter of claim 6 wherein $\rho$ for a gas is calculated substantially as:

$$\sqrt{\rho} = \left[\frac{144 M_w}{R}\right]^{.5}\left[\frac{P}{T}\right]^{.5} \sum_{i=0}^{n} \sum_{j=0}^{m} P^i \left(\frac{1}{T}\right)^j f_{ij}.$$

16. The transmitter of claim 15 wherein $\rho$ for gas is calculated as:

$$\sqrt{\rho} = \left[\frac{144 M_w}{R}\right]^{.5}\left[\frac{P}{T}\right]^{.5}\Big[f_{00} + P(f_{10} + P(f_{20} + f_{30}P)) +$$
$$\frac{1}{T}(f_{01} + P(f_{11} + P(f_{21} + f_{31}P))) +$$
$$\frac{1}{T}(f_{02} + P(f_{12} + P(f_{22} + f_{32}P)))\Big].$$

17. The transmitter of claim 16 wherein $C_d$ is calculated as:

$$C_d = b_0 + \frac{1}{\ln(Re_D)}\left(b_1 + \frac{1}{\ln(Re_D)}\left(b_2 + \frac{1}{\ln(Re_D)}\left(b_3 + \frac{1}{(Re_D)}\left(b_4 + \frac{1}{\ln(Re_D)}\left(b_5 + \frac{b_6}{\ln(Re_D)}\right)\right)\right)\right)\right).$$

18. The transmitter of claim 6 wherein $C_d$ is calculated using an equation generally in the form:

$$C_d = \sum_{i=0}^{n} \left(\frac{1}{\ln(Re_D)}\right)^i b_i.$$

19. The transmitter of claim 6 wherein the term $Ed^2 Y_1$ is calculated using an equation substantially in the form:

$$Ed^2 Y_1 = a_o + \frac{1}{T}\left(a_1 + \frac{a_2}{T}\right) + \frac{h}{P}\left[a_3 + \frac{1}{T}\left(a_4 + \frac{a_5}{T}\right) + \frac{h}{P}\left(a_6 + \frac{1}{T}\left(a_7 + \frac{a_3}{T}\right)\right)\right].$$

20. The transmitter of claim 6 wherein the microcomputing circuit is configured to calculate flow based on a plurality of polynomial equations using polynomial curve fits, each of the approximated multiplicands being approximated with a polynomial equation having at least one of the temperature, the static pressure and the differential pressure, Reynolds number as an independent variable.

21. The transmitter of claim 6 wherein the loop comprises a two-wire loop.

22. A method of providing an indication of flow of fluid through a conduit using a process control transmitter powered by a control loop, comprising:

sensing static pressure and providing a static pressure signal indicative of the static pressure;

sensing differential pressure and providing a differential pressure signal indicative of the differential pressure;

receiving a temperature signal indicative of a temperature of the fluid;

calculating flow of the fluid through the conduit based on the static pressure signal, the differential pressure signal and the temperature signal and providing an output signal indicative of the flow wherein calculating comprises calculating flow, Q, according to an equation having multiplicands generally of the form:

$$Q = N[C_d][Ed^2][Y_1][\sqrt{\rho}]\sqrt{h}$$

wherein the microcomputing circuit is configured such that at least two of the multiplicands are each approximated as a function of at least one of the temperature, the static pressure and the differential pressure.

23. The method of claim 22 wherein calculating comprises:

calculating flow based on at least one polynomial equation using a polynomial curve fit with at least one of temperature, static pressure and differential pressure being an independent variable in the polynomial equation.

24. The transmitter of claim 23 wherein calculating comprises:

calculating flow based on a plurality of polynomial equations using polynomial curve fits to approximate a plurality of $C_d$, E, $d^2$, $Y_1$, and $\rho$ with at least one of the temperature, the static pressure and the differential pressure being an independent variable in the polynomial equations.

25. The method of claim 22 wherein calculating comprises:

calculating flow based on an approximation of $C_d$ according to a polynomial equation having the form:

$$C_d = \sum_{i=o}^{n} \left(\frac{1}{\sqrt{Re_D}}\right)^i b_i.$$

26. The transmitter of claim 25 wherein $C_d$ is calculated substantially as:

$$C_d = b_0 + \frac{1}{\sqrt{R e_D}}\left(b_1 + \frac{1}{\sqrt{R e_D}}\left(b_2 + \frac{1}{\sqrt{R e_D}}\left(b_3 + \frac{1}{\sqrt{R e_D}}\left(b_4 + \frac{1}{\sqrt{R e_D}}\left(b_5 + \frac{b_6}{\sqrt{R e_D}}\right)\right)\right)\right)\right).$$

27. The method of claim 22 wherein calculating comprises:

calculating flow based on an approximation of $Ed^2$ according to a polynomial equation having the form:

$$Ed^2 = \sum_{i=0}^{n} C_i \left(\frac{1}{T}\right)^i.$$

28. The transmitter of claim 27 where $Ed^2$ is calculated substantially as:

$$Ed^2 = c_0 + 1/T(c_1 + 1/Tc_2).$$

29. The method of claim 22 wherein calculating comprises:
calculating flow based on an approximation of $Y_1$ according to a polynomial equation having the form:

$$Ed^2 = c_0 + 1/T(c_1 + 1/Tc_2).$$

30. The transmitter of claim 29 wherein $Y_1$ is calculated substantially as:

$$Y_1 = d_0 + \frac{h}{p}\left(d_1 + \frac{h}{P}d_2\right).$$

31. The method of claim 22 wherein calculating comprises:
calculating flow based on an approximation of $\rho$ for liquids according to a polynomial equation having the form:

$$\sqrt{\rho} = \sum_{i=0}^{n}\left(\frac{1}{T}\right)^i e_i.$$

32. The transmitter of claim 31 wherein $\rho$ for liquid is calculated substantially as:

$$\sqrt{\rho} = e_0 + \frac{1}{T}\left(e_1 + \frac{1}{T}\left(e_2 + e_3\frac{1}{T}\right)\right).$$

33. The transmitter of claim 31 wherein $\rho$ for gas is calculated substantially as:

$$\sqrt{\rho} = \left[\frac{144M_w}{R}\right]^{.5}\left[\frac{P}{T}\right]^{.5}\Big[f_{00} + P(f_{10} + P(f_{20} + f_{30}P)) +$$

$$\frac{1}{T}\big((f_{01} + P(f_{11} + P(f_{21} + f_{31}P))) +$$

$$\frac{1}{T}(f_{02} + P(f_{12} + P(f_{22} + f_{32}P)))\Big].$$

34. The method of claim 22 wherein calculating comprises:
calculating flow based on an approximation of $\rho$ for gases according to a polynomial equation having the form:

$$\sqrt{\rho} = \left[\frac{144M_w}{R}\right]^{.5}\left[\frac{P}{T}\right]^{.5}\sum_{i=0}^{n}\sum_{j=0}^{m}P^i\left(\frac{1}{T}\right)^j f_{ij}.$$

35. The method of claim 22 and further comprising:
powering the process control transmitter over a 4–20 mA loop.

36. A method of providing an indication of flow of fluid through a conduit using a process control transmitter powered over a control loop, comprising:
sensing static pressure and differential pressure and providing pressure signals indicative of the static and differential pressure;
receiving a temperature signal indicative of a temperature of the fluid;
calculating flow of the fluid through the conduit based on the pressure signals and the temperature signal and providing an output signal indicative of the flow;
wherein calculating flow comprises calculating flow, Q, according to an equation having multiplicands generally of the form:

$$Q = N[C_d][Ed^2][Y_1][\sqrt{\rho}]\sqrt{h}$$

wherein at least two of the multiplicands are each approximated as a function of at least one of the temperature, the static pressure, and the differential pressure.

37. The method of claim 36 wherein the multiplicands are each approximated using a polynomial equation having at least one of the temperature, the static pressure, Reynolds number and the differential pressure as an independent variable.

38. The method of claim 38 and further comprising:
powering the process control transmitter over a 4–20 mA loop.

* * * * *

UNITED STATES PATENT AND TRADEMARK OFFICE
CERTIFICATE OF CORRECTION

PATENT NO.    : 6,182,019 B1
DATED         : January 30, 2001
INVENTOR(S)   : David E. Wiklund It is certified that error appears in the above-identified patent and that said Letters Patent is hereby corrected as shown below:

Title page,
Item [56] References Cited, U.S. PATENT DOCUMENTS, insert --

| | | | |
|---|---|---|---|
| 3,701,280 | 10/1972 | Stroman | 73/194 |
| 4,238,825 | 12/09/80 | Geery | 364/510 |
| 4,414,634 | 11/08/83 | Louis et al. | 364/510 |
| 4,419,898 | 12/13/83 | Zanker et al. | 73/861.02 |
| 4,446,730 | 05/08/84 | Smith | 73/301 |
| 4,485,673 | 12/04/84 | Stern | 73/304 C |
| 4,562,744 | 01/07/86 | Hall et al. | 73/861.02 |
| 4,598,381 | 07/01/86 | Cucci | 364/558 |
| 4,602,344 | 07/22/86 | Ferretti et al. | 364/509 |
| 4,677,841 | 07/07/87 | Kennedy | 73/30 |
| 4,825,704 | 05/02/89 | Aoshima et al. | 73/861.42 |
| 4,881,412 | 11/21/89 | Northedge | 73/861.04 |
| 4,958,938 | 09/25/90 | Schwartz et al. | 374/208 |
| 5,035,140 | 07/30/91 | Daniels et al. | 73/290 V |
| 5,058,437 | 10/22/91 | Chaumont et al. | 73/861.21 -- |

Under FOREIGN PATENT DOCUMENTS, insert --

WO 88/01417  2/1988  WIPO
WO 89/02578  3/1989  WIPO
WO 89/04089  5/1989  WIPO --

Under OTHER PUBLICATIONS insert --

Product Data Sheet 4640, "Model 3201 Hydrostatic Interface Unit," March 1992, Rosemount Inc., Eden Prairie, MN 55344.

"Model 3095 Flow Transmitter," Preliminary Product Information, September 1993, Rosemount Inc., Eden Prairie, MN 55344.

Product Data Sheet 4638, "Model 3001CL Flush-Mount Hydrostatic Pressure Transmitter," July 1992, Rosemount Inc., Eden Prairie, MN 55344.

"Flow Measurement," Handbook of Fluid Dynamics, V. Streeter, Editor-in-chief, published by McGraw-Hill Book Company, Inc. 1961, pp. 14-4 to 14-15.

UNITED STATES PATENT AND TRADEMARK OFFICE
CERTIFICATE OF CORRECTION

PATENT NO. : 6,182,019 B1
DATED : January 30, 2001
INVENTOR(S) : David E. Wiklund It is certified that error appears in the above-identified patent and that said Letters Patent is hereby corrected as shown below:

OTHER PUBLICATIONS contd.
Product Data Sheet PDS 4015, "Model 3095FT Flow Transmitter, February 1994, Rosemount Inc., Eden Prairie, MN 55344.

"Hydrostatic Tank Gauging - Technology Whose Time Has Come," J. Berto, Rosemount Measurement Division Product Feature, undated reprint from INTECH.

"Pressure Sensors Gauge Tank Level and Fluid Density," Rosemount Measurement Division Product Feature, undated reprint from Prepared Foods (Copyrighted 1991 by Gorman Publishing Company).

"The Digitisation of Field Instruments" W. Van Der Bijl, Journal A, Vol. 32, No. 3, 1991, pp. 62-65.

"Low Cost Electronic Flow Measurement System," Tech Profile, May 1993, Gas Research Institute, Chicago, IL.

"Development of an Integrated EFM Device for Orifice Meter Custody Transfer Applications," S.D. Nieberle et al., American Gas Association Distribution/ Transmission Conference & Exhibit, May 19, 1993.

Advertisement, Model 3508 DP Transmitter, Control Engineering, December 1992, Bristol Babcock, Inc., Watertown, CT 06795

"Smart Transmitters Tear Up The Market," C. Polsonetti, INTECH, July 1993, pp. 42-45.

Column 7,
Equation 5, change $$Y_1 = 1 - (.41 + 35\beta^4) \frac{h}{27.73 PK}$$

to --  --

$$Y_1 = 1 - (.41 + .35\beta^4) \frac{h}{27.73 PK}$$

UNITED STATES PATENT AND TRADEMARK OFFICE
CERTIFICATE OF CORRECTION

PATENT NO. : 6,182,019 B1
DATED : January 30, 2001
INVENTOR(S) : David E. Wiklund It is certified that error appears in the above-identified patent and that said Letters Patent is hereby corrected as shown below:

Column 8,
Equation 12, change $$\rho = M\left[-\frac{1}{2B} - \frac{1}{2}\left[\frac{1}{B^2} \ 4\frac{P}{BRT}\right]^{1/2}\right]$$

to --

$$\rho = M\left[-\frac{1}{2B} - \frac{1}{2}\left[\frac{1}{B^2} \ \frac{4P}{BRT}\right]^{1/2}\right]$$

--

Column 14,
Line 66, after "an" insert -- approximation --.

Column 18,
Line 42, change "38" to -- 36 --.

Signed and Sealed this

Nineteenth Day of March, 2002

Attest:

JAMES E. ROGAN
*Attesting Officer*   *Director of the United States Patent and Trademark Office*